SWITCHING SYSTEM TO DIVERT CALLS TO A SECOND LINE

Filed Oct. 27, 1966 3 Sheets-Sheet 1

SWITCHING SYSTEM TO DIVERT CALLS TO A SECOND LINE

United States Patent Office 3,526,722

Patented Sept. 1, 1970

3,526,722

SWITCHING SYSTEM TO DIVERT CALLS TO A SECOND LINE

Egide Jacob Hendrik Deraedt, Hoboken, and George Pieter Adolf Mathildis de Bruyne, Lebbeke, Belgium, assignors to International Standard Electric Corporation, New York, N.Y., a corporation of Delaware Filed Oct. 27, 1966, Ser. No. 594,326

Claims priority, application Netherlands, Nov. 11, 1965, 6514677

Int. Cl. H04m 3/54

U.S. Cl. 179—18 9 Claims

ABSTRACT OF THE DISCLOSURE

An absentee line circuit adapter is provided for telephone systems. The adapter re-routes calls to another predetermined line in the same exchange as soon as the subscriber wishing to transfer calls to this line depresses a grounding key. The subscriber may then check to see if re-routing has been established by lifting the handset, at which time a special tone will indicate that from then on calls will be transferred.

The invention relates to a switching system including at least two stations at least one of which includes control signal generator means which when operated control the operation of switching means in the line circuit of said one station in order to allow calls destined for said one station to be diverted towards the associated station.

Such a switching system is known from the British Pat. No. 991,667 and operates in such a way that when said switching means are operated they connect a marker wire of one station to a marker wire of an associated station.

Such a solution is evidently limited to switching systems using markers for the setting up of calls.

A first object of the invention is therefore to provide a more general solution.

According to a first characteristic of the present switching system, said two stations are interconnected by a normally inoperative interconnection circuit which is allowed to become operative under the control of said switching means.

In the above known switching system it is moreover necessary in order to enable said call diversion to be performed, to dial a special number constituting a control signal. The subsequently seized register which receives this number reacts on this signal by disconnecting itself from the calling station. Hence not only a call must be simulated but also the registers must be able to receive said special number and to react in a particular way to the receipt of such a number.

Another object of the invention is therefore to provide a switching system of the above type but which permits a call diversion to be allowed in a simpler manner and without it being necessary to modify the registers.

According to another characteristic of the present switching system the control signal generated by said generator means is constituted by a ground capable of being applied to one of the line wires of said one station.

Figure 1:
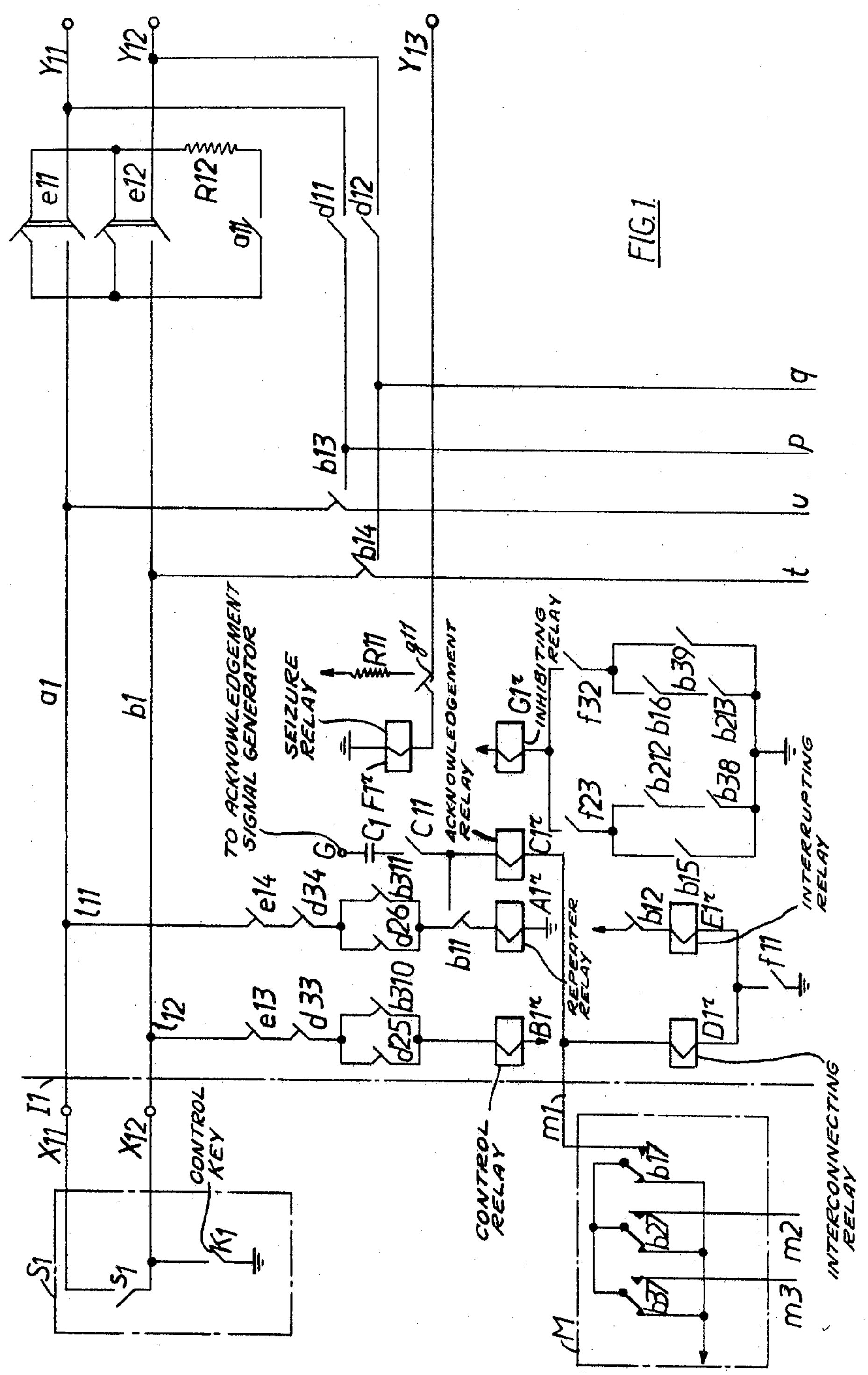
Figure 2:
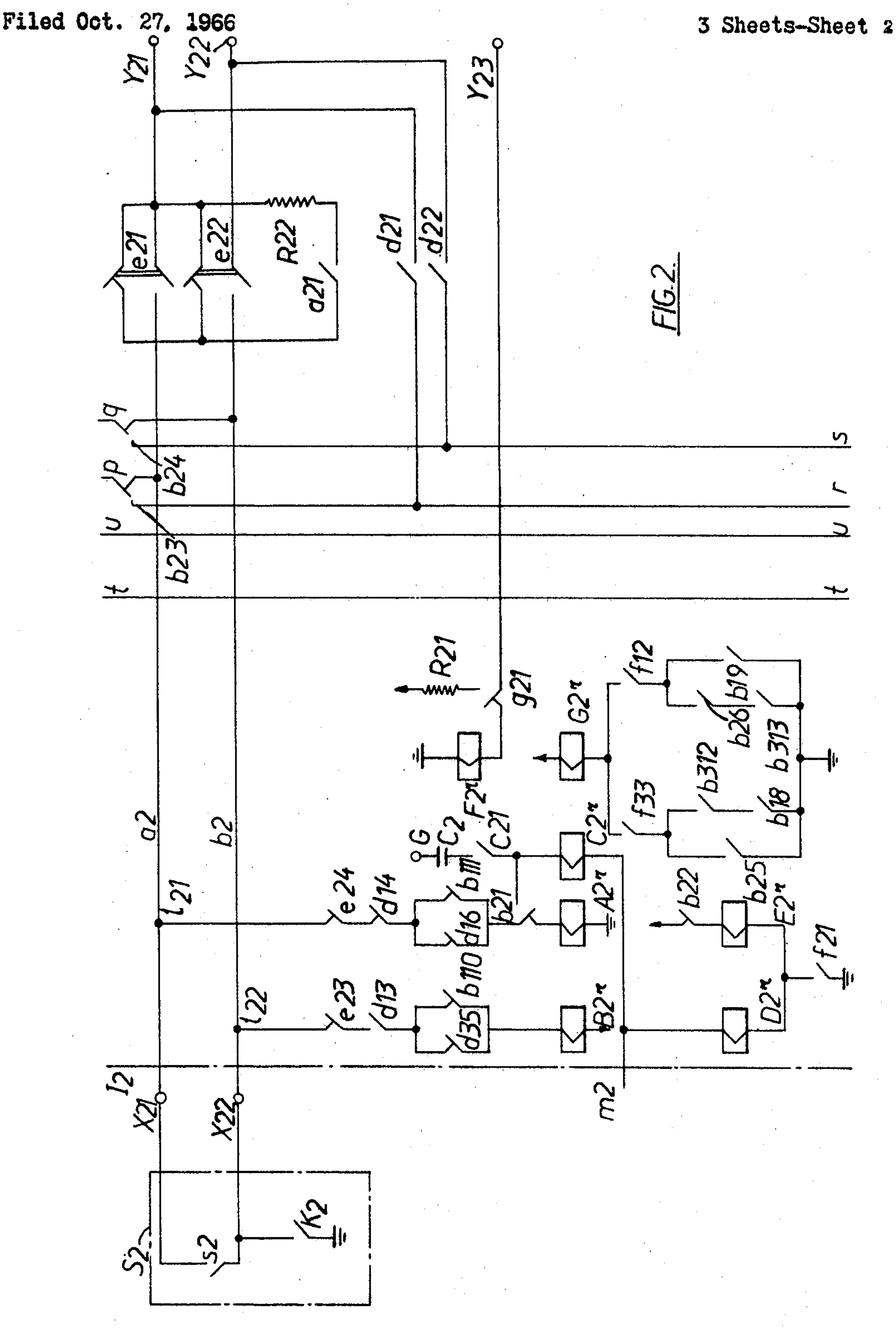
Figure 3:
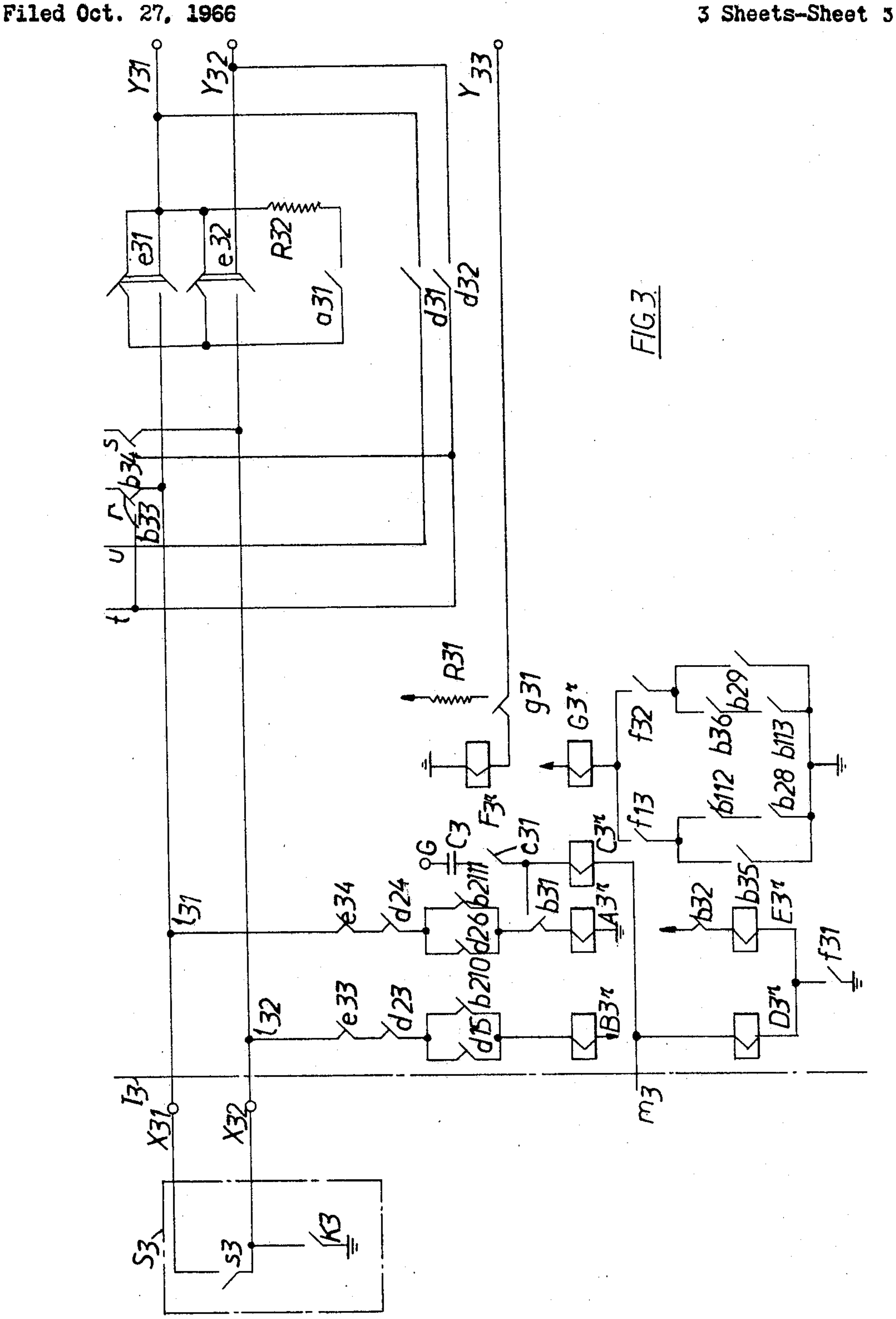

The above mentioned and other objects and features of the invention will become more apparent and the invention itself will be best understood by referring to the following description of an embodiment taken in conjunction with the accompanying drawings wherein FIGS. 1 to 3 arranged one below another represent a schematic diagram of a switching system according to the invention.

The switching system shown is part of a telephone switching system and includes three subscriber stations S1, S2, S3 the pairs of output wires of which are connected to the pairs of first input terminals X11, X12; X21, X22; X31, X32 of the respective line circuits I1, I2, I3 which further each have three second input terminals Y11, Y12, Y13; Y21, Y22, Y23; Y31, Y32, Y33 respectively. The latter terminals are connected in the arcs of line finder/final selector switches (not shown) included in the above telephone switching system or exchange. Each of the pairs of second input terminals Y11, Y12; Y21, Y22; Y31, Y32 of the line circuits I1, I2, I3 is coupled to the respective following station S2, S3, S1 via a pair of contacts *d*11, *d*12; *d*21; *d*22; *d*31, *d*32 of an interconnecting relay D1*r*, D2*r*, D3*r* included in the respective line circuit I1, I2, I3 and the break contacts of a pair of change-over contacts *b*23, *b*24; *b*33, *b*34; *b*13, *b*14 of a control relay B1*r*, B2*r*, B3*r* included in these respective line circuits. The make contacts of these pairs of changeover contacts *b*13, *b*14; *b*23, *b*24; *b*33, *b*34 are further connected to the break contacts of the pairs of change-over contacts *b*23, *b*24; *b*33, *b*34; *b*13, *b*14 via leads *p*, *q*; *r*, *s* and *t*, *u* respectively.

The line circuits I1, I2 and I3 are identical and therefore only the line circuit I1 is described in detail hereinafter, the elements included in these line circuits being characterized by the indicia 1, 2 and 3 respectively.

The pair of terminals X11, X12 of the line circuit I1 is coupled to the pair of terminals Y11, Y12 thereof via the pair of wires *a*1, *b*1 and the make contacts of the pair of change-over contacts *e*11, *e*12 of an interrupting relay E1*r*. The break contacts of these change-over contacts *e*11, *e*12 are branched in parallel and connected in series with the make contact *a*11 of a repeater relay A1*r* and with a resistor R12 between the pair of terminals Y11 and Y12. The test terminal Y13 is connected to ground via the break contact of a change-over contact *g*11 of an inhibiting relay G1*r* and the winding of a seizure relay F1*r* and to battery via the make contact of this change-over contact *g*11 and a resistor R11.

The terminal X11 is connected to ground via lead *l*11, break contact *e*14 of interrupting relay E1*r*, break contact *d*34 of interconnecting relay D3*r* of line circuit I3, parallel connected break contacts *b*311 of control relay B3*r* of line circuit I3 and *d*26 of interconnecting relay D2*r* of line circuit I2, break contact of change-over contact *b*11 of control relay B1*r* and winding of repeater relay A1*r*. The make contact of the latter change-over contact *b*11 is connected, on the one hand, to an inhibiting circuit M via the winding of acknowledgement relay C1*r* and lead *m*1 and, on the other hand, to terminal G via make contact *c*11 of this acknowledgement relay C1*r* and capacitor C1. Hereby it should be noted that all the terminals G of the line circuits I1, I2, I3 are joined together and connected to an acknowledgement signal generator (not shown). The lead *m*1 is also connected to one end of the winding of relay D1*r*, the other end of this winding and the one end of the winding of relay E1*r* being connected to ground via make contact *f*11 of relay F1*r*. The other end of the winding of relay E1*r* is connected to battery via break contact *b*12 of relay B1*r*.

The terminal X12 is connected to battery via lead *l*12. break contact *e*13 of relay E1*r*, break contact *d*33 of relay D3*r* of line circuit I3, parallel connected break contacts *d*25 of relay D2*r* of line circuit I2 and *b*310 of relay B3*r* of line circuit I3, and the winding of relay B1*r*.

The winding of the above inhibiting relay G1*r* is connected between battery and ground in series with the following parallel connected circuits:

Make contact *f*23 of relay F2*r* of line circuit I2 in series with a parallel circuit one branch of which comprises make contact b15, while the other branch comprises the series connected make contacts b212 and b38 of relays B2r and B3r respectively;

Make contact f32 of relay F3r of line circuit I3 in series with a parallel circuit one branch of which comprises make contact b39 of relay B3r, while the other branch comprises the series connected make contacts b16 and b213 of relays B1r and B2r respectively.

The above inhibiting circuit M comprises three change-over contacts b17, b27, b37 of the respective control relays B1r, B2r, B3r included in the line circuits I1, I2, I3 respectively. The fixed contacts of these change-over contacts are joined together and connected to battery, whereas the other fixed contacts thereof are connected to the leads m1, m2, m3 of the respective line circuits I1, I2, I3. The movable armatures of the change-over contacts b17, b27, b37 are joined together.

From the above it follows that the second input terminals of the line circuit associated with each station (e.g. S1) are connected to an adjacent station (e.g. S2) by a normally inoperative interconnecting circuit which is operated by the closure of a pair of d contacts and to yet another station by a normally inoperative interconnecting circuit which is operated by the closure of a pair of d contacts and the operation of a pair of b contacts. For instance, the input terminals Y11, Y12 of line circuit I1 may be connected to station S2 by the closure of contacts d11 and d12 and to station S3 by the closure of contacts d11 and d12 and by the operation of contacts b23 and b24.

The stations S1, S2, S3 are identical and each includes a telephone subset (not shown) comprising a respective cradle make contact s1, s2, or s3 which closes the respective line loop upon the telephone handset being lifted off. A control key K1, K2, K3 is connected to the line wire leading to the respective terminal X12, X22, X32 and when actuated it applies a control signal, constituted by a ground, to the respective one of these terminals.

The operation of the above switching system is described in detail hereinafter. Initially it is supposed that all the contacts are in the position shown.

When calls destined for station S1 must be diverted to station S2 the control key K1 is actuated due to which relay B1r is energized as follows: ground, control key K1, terminal X12, lead l12, contacts e13 and d13, contacts d25 and b310 in parallel, winding of relay B1r, battery.

The energized relay B1r changes the position of its contacts b11 to b113 and more particularly of b11 to b16 in line circuit I1, of b17 in inhibiting circuit M, of b18 to b111 in line circuit I2 and of b112 and b113 in line circuit I3.

The contacts b11; b15, b16 and b17 in their work position (i.e. in a make or break position) prepare the operation of the acknowledgement relay C1r, of the inhibiting relay G1r and of the interconnecting relay D1r respectively. The contact b12 in its work position (i.e. in a make or break position) prevents the operation of interrupting relay E1r so that the interconnection of station S1 to the exchange is rendered impossible. The contacts b13 and b14 in their work position connect the leads t, u to the leads p, q thus preventing signals from arriving in station S1 via contacts b13, b14. In line circuit I2 the contacts b18 and b19 in their work position prepare the operation of inhibiting relay G2r, whereas the contacts b110 and b111 in their work position open in the operation circuits of the control relay B2r and of the repeater relay A2r respectively. Finally, in line circuit I3 the change of position of contacts b112 and B113 has no effect on the condition of the inhibiting relay G3r.

After he has actuated control key K1 a subscriber at station S1 may positively reassure himself that calls towards this station S1 will be diverted towards station S2 by lifting his telephone handset. As a result of the actuation of control key K1, the acknowledgement relay C1r is energized as follows: battery, break contacts of change-over contacts b27 and b37 in parallel, contact b17, lead m1, winding of relay C1r, contacts b11, b311, d26, d34, e14, lead l11, terminal X11, cradle contact s1, control key K1, ground. The closure of contact c11 causes an acknowledgement signal to be applied to station S1 via capacitor C1 from the signal generator connected to terminal G.

When a call is made towards station S1 a connection is set up in the exchange to the terminals Y11, Y12 and Y13 via a line finder/final selector switch in a classical and therefore not shown manner. Subsequently a ringing signal is applied to terminals Y11 and Y12, whereas a seizure signal constituted by a battery is simultaneously applied to test terminal Y13. This ringing signal is not able to reach station S1 due to terminals Y11, Y12, being disconnected from terminals X11, X12 by contacts e11, e12. By the seizure battery the seizure relay F1r is energized as follows: battery at test terminal Y13, contact g11, winding of relay F1r, ground.

The operated relay F1r closes its make contacts f11, f12 and f13 in line circuits I1, I2 and I3 respectively. In line circuit I1 the interconnecting relay D1r is energized as follows: ground, contact f11, winding of relay D1r, contact b17 in its work position, contacts b27 and b37 in parallel, battery. By the closure of contacts d11 and d12 the terminals Y11, Y12 are connected to the wires a2, b2 leading to the station S2 so that the above ringing signal applied to the terminals Y11 and Y12 is diverted towards the latter station S2. When the subscriber of station S2 subsequently lifts his telephone handset he is in communication with the calling subscriber. By the opening of contacts d13 and d14 in line circuit I2 the relays B2r and A2r are disconnected from the station S2 so that the above ringing signal cannot influence the condition of these relays. The opening of contacts d15 and d16 in line circuit I3 affect the operating circuits of relays B3r and A3r in line circuit I3 but does not prevent these relays from being energized.

In line circuit I2 the inhibiting relay G2r is operated as follows upon relay F1r having been energized: battery, winding of relay G2r, contacts f12 and b19, ground. Due to this the test terminal Y23 is connected to battery via contact g21 so that it is rendered busy thus preventing calls made towards station S2 via terminals Y21 and Y23 to reach this station.

In line circuit I3 the closure of contact f13 has no effect on the condition of inhibiting relay G3r so that calls can still be made towards station S3 via terminals Y31 and Y32.

From the above it follows that when in station S1 control key K1 is actuated the calls made to station S1 are diverted to station S2 to which no direct calls can then be made.

In case control key K1 has not been actuated calls can be made from and towards station S1. Indeed, when a subscriber in station S1 then lifts his handset to make a call the repeater relay A1r is energized as follows: ground, winding of relay A1r, contacts b11, d26, b311, d34, e14, lead l11, terminal X11, cradle contact s1, terminal X12, lead l12, contacts e13, d33, d25, b310, winding of relay B1r, battery.

Relay B1r is however not operated since its winding has a high impedance with respect to that of relay A1r. Consequently the terminals Y11 and Y12 are interconnected via break contact e11, contact a11 and resistor R12, so that the closure of cradle contact s1 is so to say repeated due to which the call is effectively initiated.

When a call is made towards station S1 wherein control key K1 is not operated the seizure relay F1r is energized by a seizure signal applied to test terminal Y13 in the same manner as described above when control key K1 is actuated. But instead of relay D1r the interrupting relay E1r is energized as follows: battery, contact b12, winding of relay E1r, contact f11, ground. The contacts e11 and e12 in their work position connect the terminals Y11 and Y12 to the station S1 so that the ringing signal, which is applied to these terminals at the moment said seizure signal is applied to test terminal Y13, operates the ringing circuit of the subset included in station S1. By the opening of contacts *e*13 and *e*14 the relays B1*r* and A1*r* are disconnected from the wires *a*1 and *b*1 so that the condition of these relays cannot be influenced by the above ringing signal.

Obviously calls are possible from and towards station S2 independently from the position of control key K1 and on condition that no call is being made towards station S1 when control key K1 is actuated. Calls are also possible from and towards station S3.

In case not only control key K1 but also control key K2 in station S2 has been actuated calls towards station S1 are diverted towards station S3 on condition that key K3 has not been operated previously, as will be described hereinafter.

In line circuit I1 the relays B1*r*, D1*r* and F1*r* are energized in the manner described above and in line circuit I2 control relay B2*r* is operated in an analogous manner as control relay B1*r*. Due to this the terminals Y11, Y12 are connected to station S3 via contacts *d*11, *d*12, contacts *b*23, *b*24 in their work position and contacts *b*33, *b*34 in their rest position. Inhibiting relay G2*r* is also energized as described above so that no direct calls can reach station S2. Finally, no direct calls can reach station S3 since inhibiting relay G3*r* being energized as follows: battery, winding of relay G3*r*, contacts *f*13, *b*112, *b*28, ground. This relay connects test terminal Y33 to battery via contact *g*31 and resistor R31 due to which this test terminal is rendered busy.

In case the control key K1 is actuated when control keys K2 and K3 have already been actuated calls made to station S1 are obviously not to be diverted since they would again arrive in this station. Such a connection in cascade of the three stations S1, S2 and S3 is prevented by the inhibiting circuit M since when all the control keys K1, K2 and K3 are actuated the relays B1*r*, B2*r* and B3*r* are all energized so that the battery is disconnected from leads *m*2 and *m*3 and particularly from lead *m*1 due to which the operation of interconnecting relay D1*r* is prevented. When the subscriber in station S1 then lifts his telephone handset in order to divert calls towards this station he will not receive an acknowledgement signal, since the operation of the acknowledgement relay C1*r* is also prevented by the inhibiting circuit M.

In the above the interconnection of called station S1 and station S2 or S3 has been described in detail. Obviously each of the latter stations can be connected in an analogous manner to any of the other stations.

In the switching system shown each line circuit is normally disconnected from the exchange by the make contacts of an interrupting relay E1*r*, E2*r*, E3*r* due to which this relay has to be operated in case of incoming calls and a repeater relay A1*r*, A2*r*, A3*r* has to be energized in case of outgoing calls.

Instead of proceeding in this manner one could also replace in each station e.g. in S1, the make contacts of the interruption relay E1*r* by break contacts of the seizure relay F1*r*. In this case it would however be necessary to provide in each station additional circuits preventing a ringing signal from operating the ringing circuit of the subset included in this station S1 and preventing from energizing the control relay B1*r* included in the line circuit of this station S1. Indeed, without such additional circuits, a ringing signal applied to terminals Y11, Y12 always arrives in station S1, i.e. even when control key K1 is actuated, and is applied to this station until seizure relay F1*r* is energized by the seizure signal applied to terminal Y13. In case control key K1 is actuated this may give rise to an erroneous operation since a person present in station S1 may hook off his handset and so interrupt the ringing signal which will hence never reach station S2. Consequently, the call announced by the ringing signal is not at all diverted to station S2 although control key K1 has been actuated. Such an erroneous operation is prevented by a control key K1 which not only applies a ground to a line wire but also interrupts the ringing circuit of the subset included in station S1. Another erroneous operation is that when control key K1 is not actuated an above ringing signal may operate the control relay B1*r* which should only be energized when control key K1 is actuated. In order to prevent such erroneous operation a high impedance circuit for this ringing signal has to be branched between the line wire *b*1 and the winding of this control relay.

Since the interruption of the ringing circuit of a subset by a control key necessitates this subset to be modified and due to the high impedance circuit being relatively expensive, the shown solution has been preferred over the additional circuits even though repeater relay A1*r* is not necessary when using the latter circuits.

While the principles of the invention have been described above in connection with specific apparatus, it is to be clearly understood that this description is made only by way of example and not as a limitation on the scope of the invention.

What is claimed is:

1. A switching system for diverting calls from a first line to a second line comprising two subscriber stations connected to corresponding line circuits, switching means coupled to the line circuit of one of said stations to cause calls directed to said one station to be diverted towards the associated station, said switching means including a manual control coupled to a control relay in the line circuit, means interconnecting said two stations through normally inoperative interconnection circuits, said switching means including a seizure relay which is energized in response to a seizure signal in the line circuit indicating a call to the one station, and an interconnecting circuit between said one and associated stations including an interconnecting relay which is operated when simultaneously said control and said seizure relays are energized, said energized control and seizure relays of the line circuit of said called station operating an inhibiting relay included in the line circuit of said associated station, the thus operated inhibiting relay preventing the seizure relay included in the line circuit of said associated station from being operated upon a seizure signal being applied thereto.

2. A switching system according to claim 1 in which the manual control provides a control signal in the form of a ground which is applied to operate the control relay.

3. A switching system according to claim 1 in which the line circuit of said first one of said stations includes means for supplying a request acknowledgement signal in response to closure of the hookswitch, an acknowledgement relay operated when simultaneously the said control signal and the request acknowledgement signal are generated in said one station, said acknowledgement relay applying an acknowledgement signal from an acknowledgement signal generator to said one station.

4. A switching system according to claim 1, in which the line circuit of each station includes an interrupting relay which normally disconnects this station from the exchange wherein said seizure signal is generated and which when operated connects this station to said exchange, said interrupting relay being operated when simultaneously said control relay and said seizure relay of said line circuit are released and operated respectively.

5. A switching system according to claim 4, in which said line circuit further includes a repeater relay operated when simultaneously said control relay is not operated and the line loop in the station is closed, the thus operated repeater relay repeating the closure of said loop notwithstanding the released condition of said interrupting relay.

6. A switching system according to claim 5, including *m* stations each interconnected with the next by one of said interconnecting circuits, and an inhibiting circuit associated with each of the first $m-1$ stations, each inhibiting circuit being normally inoperative and allowing for the diversion of a call to the next station through up to $m-1$ interconnecting circuits in cascade, said inhibiting circuits being made operative individually when a control signal is generated in the first $m-1$ stations, and said inhibiting circuits in operative condition preventing the seizure relay of the same station from being energized.

7. A switching system according to claim 6, in which, when a call is to be diverted from said called station to another station through a cascade of up to $m-1$ interconnecting circuits, the first interconnecting circuit extending between said called station and said associated station is made operative by the operation of said interconnecting relay included in said first interconnecting circuit, whereas each of the other interconnecting circuits of said cascade is made operative when said control relay included in the line circuit of the corresponding station from which the interconnecting circuit emanates is energized.

8. A switching system according to claim 7 in which said inhibiting circuits in operative condition prevent said interconnecting relays from being energized when the control relays of the line circuits of all said $m$ stations are energized.

9. A switching system according to claim 8 in which said energized seizure and control relays of said called station operate the inhibiting relays of the line circuits of said other station and of the stations between said called and other station, each operated inhibiting relay preventing the operation of the seizure relay included in the same line circuit.

References Cited

UNITED STATES PATENTS 2,095,712 10/1937 Peterson ---------- 179—18

KATHLEEN H. CLAFFY, Primary Examiner

D. L. STEWART, Assistant Examiner

UNITED STATES PATENT OFFICE
CERTIFICATE OF CORRECTION

Patent No. 3,526,722 September 1, 1970

Egide Jacob Hendrik De Raedt et al.

It is certified that error appears in the above identified patent and that said Letters Patent are hereby corrected as shown below:

In the heading to the printed specification, line 4, "Egide Jacob Hendrik Deraedt" should read -- Egide Jacob Hendrik De Raedt --; lines 4 and 5, "George Pieter Adolf Mathildis de Bruyne" should read -- George Pieter Adolf Mathildis De Bruyne Signed and sealed this 6th day of April 1971.

(SEAL)
Attest:

EDWARD M.FLETCHER,JR.
Attesting Officer

WILLIAM E. SCHUYLER, JR.
Commissioner of Patents